Jan. 10, 1939.  H. R. WARNKE  2,143,097
TELEPHONIC UNIT
Filed April 10, 1936  4 Sheets-Sheet 1
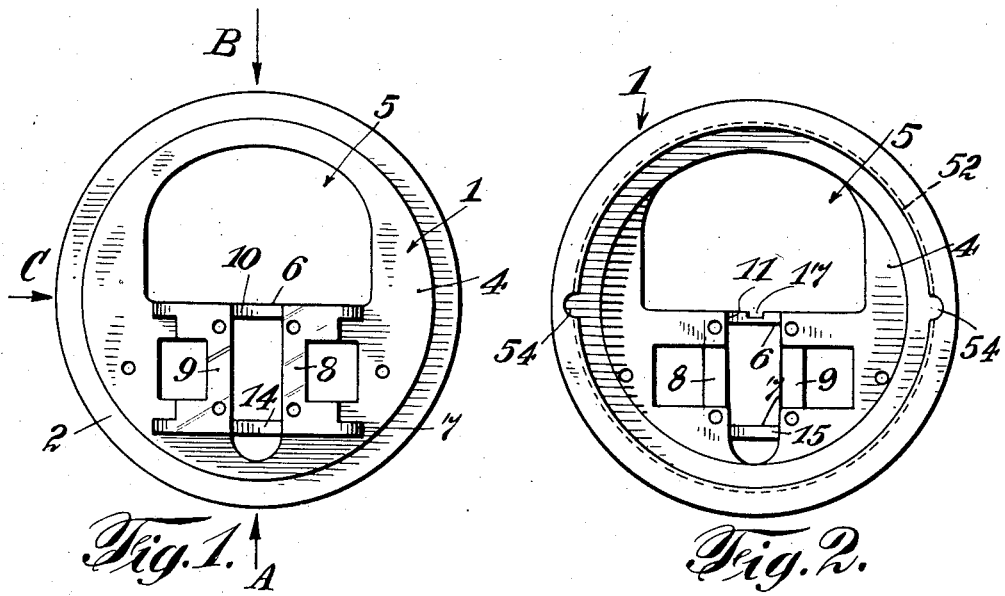
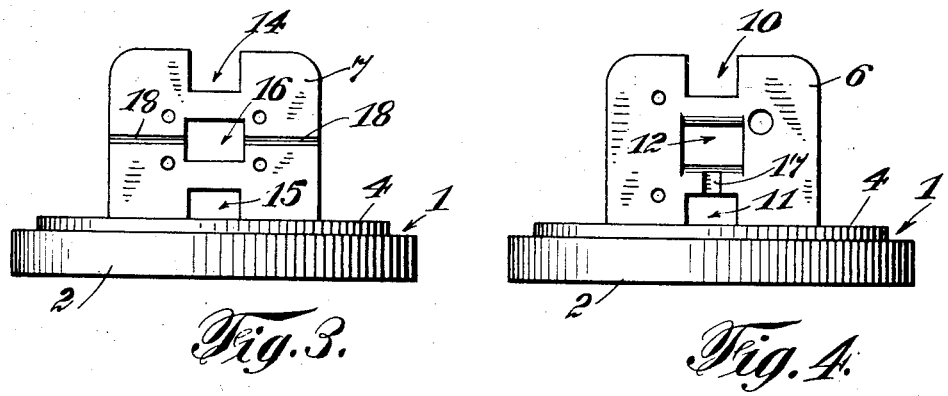
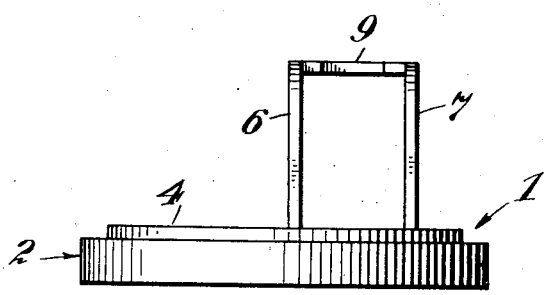
Fig.5.  INVENTOR
Herbert R. Warnke
BY
Ramsey, Kent, Chisholm & Lutz
his ATTORNEYS Jan. 10, 1939.  H. R. WARNKE  2,143,097
TELEPHONIC UNIT
Filed April 10, 1936  4 Sheets-Sheet 2

INVENTOR
Herbert R. Warnke
BY Ramsey, Kent,
Chisholm & Lutz
his ATTORNEYS

Jan. 10, 1939.  H. R. WARNKE  2,143,097
TELEPHONIC UNIT
Filed April 10, 1936   4 Sheets-Sheet 3

INVENTOR
Herbert R. Warnke
BY
his ATTORNEYS

Jan. 10, 1939. H. R. WARNKE 2,143,097
TELEPHONIC UNIT
Filed April 10, 1936 4 Sheets-Sheet 4

INVENTOR
*Herbert R. Warnke*
BY
*Ramsey, Kent, Chisholm & Lutz*
his ATTORNEYS

Patented Jan. 10, 1939

2,143,097

UNITED STATES PATENT OFFICE 2,143,097

TELEPHONIC UNIT

Herbert R. Warnke, New York, N. Y., assignor to Control Instrument Company, Inc., Brooklyn, N. Y., a corporation of New York Application April 10, 1936, Serial No. 73,695

9 Claims. (Cl. 179—119)

This invention relates to a telephonic unit capable of operating as a receiving unit or as a transmitting unit so that a telephone line may be established between a plurality of identical units of the character shown herein by connecting these units in a circuit, and utilizing the same unit at different times for receiving and transmitting.

It is desirable in a device of this kind that the parts shall be compactly and accurately assembled in such manner as to be capable of withstanding rough usage without being incapacitated, and that the operating elements shall be capable of high efficiency operation.

The present device comprises constructions, including a main frame, which are so arranged as to automatically accurately position the various parts in their assembled relation so that an efficient, secure, and accurate assembly is accomplished when the parts are fitted together.

A further feature of the present invention is the arrangement of materials in the magnetic circuit which provide high efficiency.

Another feature of the present invention is the provision of adjusting means for accurately positioning the armature element within the magnetic field.

Other and further objects of the present invention will in part be obvious and will in part be pointed out hereinafter in the specification by reference to the accompanying drawings forming a part of this specification. Like parts are indicated by like characters throughout the several figures of the drawings.

It is to be understood that the disclosure herewith is illustrative and not to be considered in the limiting sense.

Fig. 1 is a top plan view of the main frame.

Fig. 2 is a bottom plan view of the main frame.

Fig. 3 is an elevational view looking in the direction of the arrow A on Fig. 1.

Fig. 4 is an elevational view looking in the direction of the arrow B on Fig. 1.

Fig. 5 is an elevational view looking in the direction of the arrow C on Fig. 1.

Figure 6:
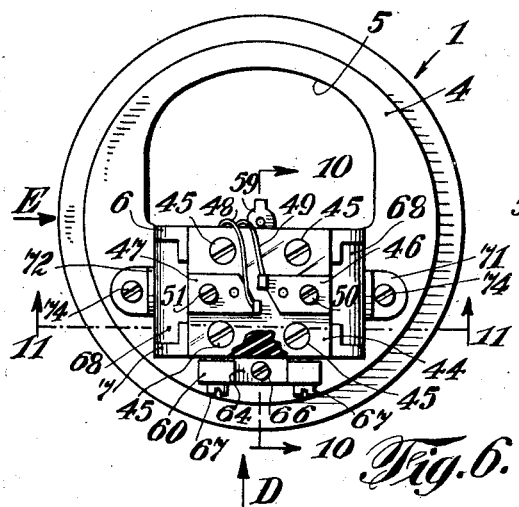
Fig. 6 is a top plan view of the assembled device with the diaphragm omitted.
Figure 7:
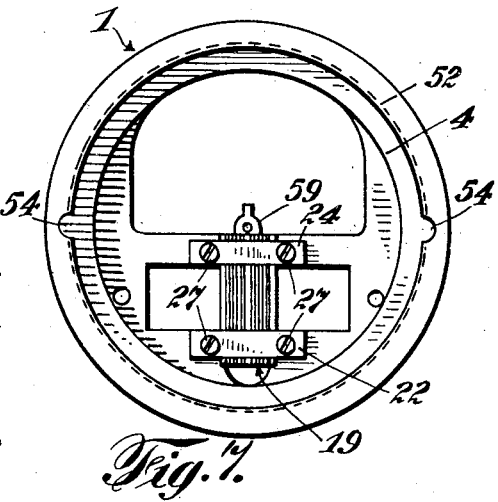
Fig. 7 is a bottom plan view of the assembled device with the diaphragm and clamp rings omitted.
Figure 8:
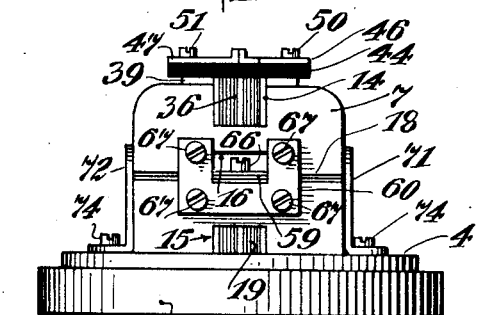
Fig. 8 is an elevational view looking in the direction of the arrow D of Fig. 6.
Figure 9:
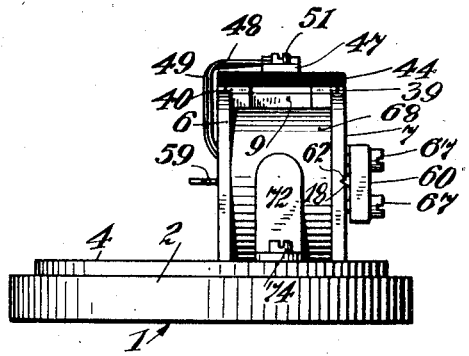
Fig. 9 is an elevational view looking in the direction of the arrow E, Fig. 6.

Referring to the drawings and more especially to Figs. 1 to 5 thereof which illustrate the frame of the device, a main frame 1 comprises a base portion 2 having a table 4 which is provided with an opening 5 and which carries integrally therewith a front plate 6 and a back plate 7. The front plate 6 and the back plate 7 are connected at the top by integral bars 8 and 9. The front plate 6 is provided with an upper recess 10 for the top pole piece and with a lower recess 11 for the bottom pole piece and with a central opening 12 for the armature. The back plate 7 is provided with an upper recess 14 for the top pole piece and a lower recess 15 for the bottom pole piece. This plate 7 is also provided with a central opening 16 for the armature. The upper recesses 10 and 14 are matched with their bases in alignment and the lower recesses 11 and 15 are also matched with their respective bases aligned and the distance between the bars 8 and 9 is exactly the width of the upper recesses so that these several recesses 10, 11, 14, and 15 form accurate seats for pole pieces as will be later pointed out. The front plate 6 is provided with a channel 17 beneath the central opening 12 to accommodate an operating post connecting the armature and the diaphragm. The back plate 7 is provided with a V-shaped groove 18 to receive a V-shaped member on the mounting for the armature as will be later described. This main frame is one integral die casting and is provided with suitable screw threaded openings to be utilized in the assembly of the device as will be later described.

Referring now to Figs. 6 to 12 inclusive, the bottom pole piece 19 is positioned in the main frame so that the shoulders 20 and 21 on this pole piece seat against the upper part of the lower recess 11 in the front plate 6 and in the lower recess 15 in the back plate 7. A pair of clamp bars (Fig. 7) 22 and 24 accurately fit channels 25 and 26 (Fig. 12) in the bottom pole piece, and the clampbars are held in position by machine screws 27 (Fig. 7) which are threaded into the under part of the table 4 of the main frame 1. When the bottom pole piece 19 is positioned as described, the poles 28 and 29 thereof fit within the space between the front plate 6 and the back plate 7 (see Fig. 10) so that this pole piece is now accurately and positively positioned within the main frame.

The energizing coil 30 is wound upon a suitably molded magnetically inert spool 31, which may be conveniently made of a phenol condensation product or other similar material. This spool 31 has the heads thereof provided with a pair of top recesses 32 and a pair of bottom recesses 34. These recesses 32 and 34 are exactly the width of the pole piece 19 and the length of the spool is equal to the distance between the poles 28 and 29 of the pole piece 19.

After the pole piece 19 has been assembled to the frame, the coil 30 is slipped into position between the front plate 6 and the back plate 7 with the recesses 34 fitting over the pole piece 19. This accurately positions the coil 30 in the assembly with the opening 35 of the coil in the center of the central openings 12 and 16 of the front and back plates, respectively.

The upper pole piece 36 is slipped into the upper recesses 10 and 14 in the front and back plates respectively with the poles 37 and 38 thereof in engagement with the inner sides of the front plates 6 and the back plates 7. The bars 8 and 9 of the frame extend along the sides of the upper pole piece 36 securely positioning the pole piece in the assembly. Clamp bars 39 and 40 fit within channels 41 and 42 (Fig. 12) of the upper pole piece and a terminal plate 44 of insulating material is positioned over the clamp bars 39 and 40 so that machine screws 45 may pass through the terminal plate 44, and the clamp bars 39 and 40 to anchor these several parts in accurate position. The terminal plate of insulating material carries terminal bars 46 and 47 to which the terminals 48 and 49 (Fig. 9) of the coil 30 are soldered. These terminal bars 46 and 47 are provided with connecting screws (Fig. 11) 50 and 51 which may be utilized to connect the coil 30 in a suitable circuit.

Figure 10:
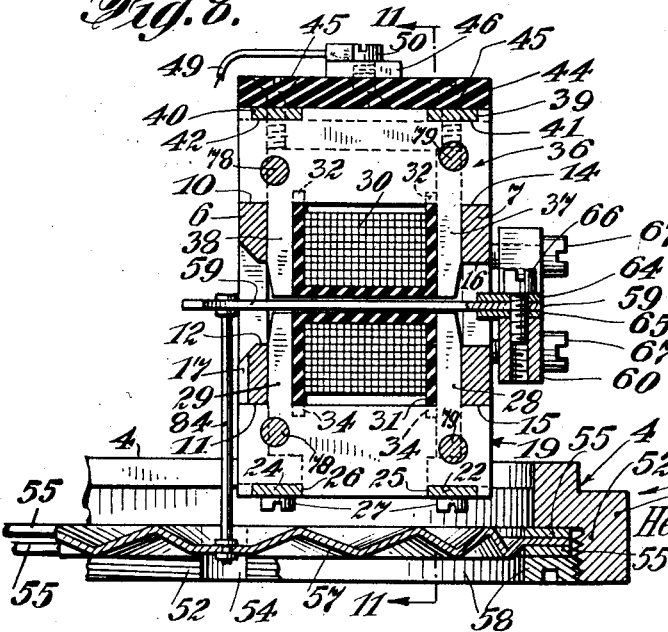
Fig. 10 is a detail sectional view on line 10—10 of Fig. 6 showing the diaphragm in place.
Figure 11:
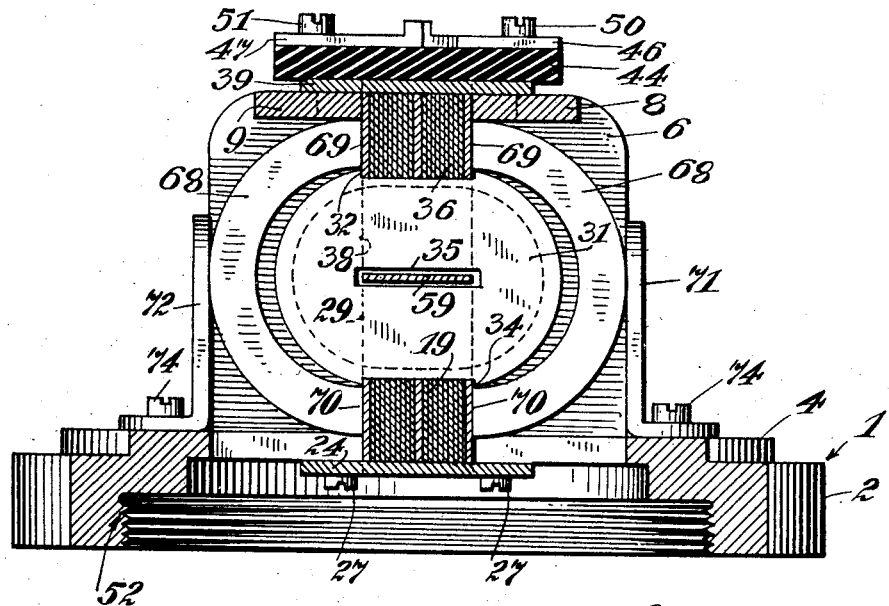
Fig. 11 is a sectional view on line 11—11 looking in the direction of the arrow D of Fig. 6.
Figure 12:
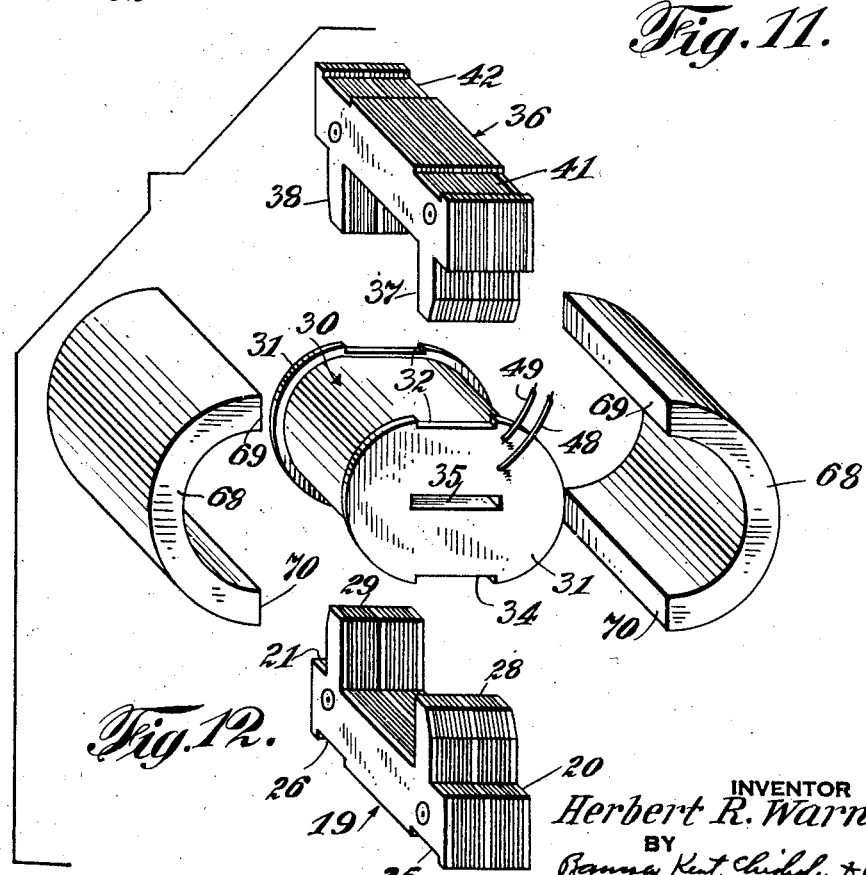
Fig. 12 is a view of the coil and the permanent magnets and the pole pieces in separated relation illustrating how the parts may be assembled.
Figure 13:
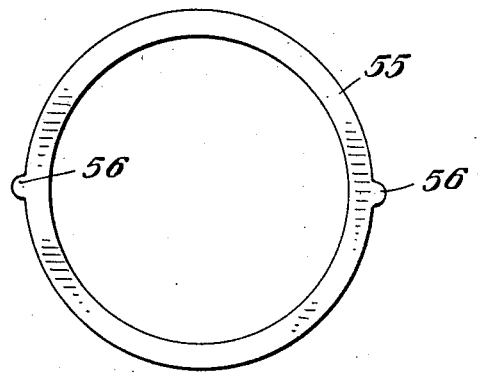
Fig. 13 is a plan view of one of the clamp rings used to hold the diaphragm in place.

From the foregoing, it will be observed that the parts are so constructed that they are rigidly and accurately positioned by a single piece main frame so that when the parts are assembled in the main frame, the assembly becomes a rigid unitary construction which facilitates great accuracy in positioning of the parts. This is extremely important in telephonic devices. The under part of the main frame 1 comprises an internally screw threaded ring 52 (Figs. 2 and 10). This screw threaded ring is recessed on opposite sides with recesses 54 (Fig. 2). Clamp rings 55 are provided with lugs 56 that fit into the recesses 54. One of these clamp rings 55 dropped within the screw threaded ring 52 and a diaphragm 57 (Fig. 10) is positioned thereupon.

Another clamp ring 55 of exactly the same construction is dropped into position over the edge of the diaphragm so that the edge of the diaphragm rests between identical clamp rings 55. A screw threaded retaining ring 58 is now screw threaded within the internally threaded ring 52 on the main frame 1 and this ring 58 tightly clamps the diaphragm 57 between the pair of clamping rings 55. The lugs 56 in engagement with the recesses 54 in the main frame prevent any rotative action reaching the diaphragm 57 when the retaining ring 58 is screwed solidly into place. This makes a very strong, positive mounting for the diaphragm 57 which is preferably of the corrugated type of very light weight metal.

Figure 18:
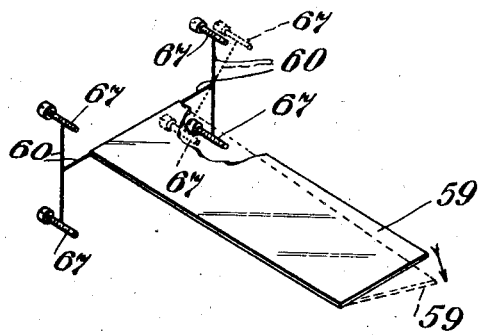
Fig. 18 is a diagrammatic view illustrating the adjustment feature of the mounting for the armature.
Figure 19:
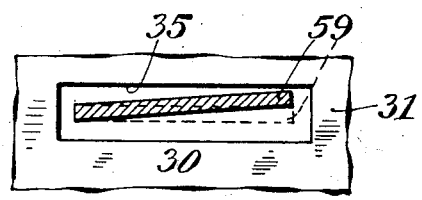
Fig. 19 is a detail view illustrating how the mounting for the armature adjusts the armature in the armature operating opening.

The armature 59 is carried by an adjustable mounting 60 (Figs. 6, 8, 9, 10, and 17). This mounting 60 comprises a relatively heavy metal U-shaped plate provided with smooth openings 61 and also provided with a V-shaped rib 62. The armature 59 is mounted between a pair of plates 64 and 65 (Fig. 10) and is securely locked to the mounting 60 with the machine screw 66. The rib 62 of the mounting 60 is positioned in the groove 18 in the back plate 7 (Figs. 3 and 8) by machine screws 67 which are positioned in the four corners of the mounting 60 and are threaded into the back plate 7. This arrangement accurately positions the armature 59 within the opening 35 of the coil 30 adjacent the back plate 7, but the armature at its front end may require adjustment. By loosening the lower pair of machine screws 67 (Fig. 8) and tightening the upper pair of machine screws 67, the forward end of the armature 59 may be raised or lowered in the opening 35 as desired. If the armature is slightly twisted at the front end thereof, as is sometimes the case, this may be corrected by adjustment of the screws 67. In Figs. 18 and 19, this adjustment is illustrated. By manipulating one of the upper screws 67 to tighten the same and the lower opposed screw 67 to loosen the same, the armature 59 will be twisted to dotted line position illustrated in Fig. 18. This action is illustrated in Fig. 19 which represents the front end of the armature in the opening 35 and shows how the tightening of one upper screw and the loosening of its corresponding lower screw will tip the front end of the armature from full line position to dotted line position in Fig. 19.

In telephonic apparatus, minute adjustments are extremely important so that this construction which permits maximum adjustability is an important feature of the present invention.

After the bottom pole piece 19 and the upper pole piece 36 have been assembled around the coil 30, the permanent magnets 68 are positioned around the coil 30. These magnets are so constructed as to approximately fit around the coil 30 when the ends 69 and 70 of the magnets 68 contact with the sides of the pole pieces 19 and 36 respectively, to complete the magnetic circuit. The permanent magnets are assembled in such manner that like poles of these permanent magnets contact on opposite sides of the respective pole pieces 19 and 36 so that these pole pieces become opposite magnetic poles on each side armature 59 to set up a very strong magnetic field through the armature 59. The permanent magnets 68 are held in position by brackets 71 and 72 (Figs. 6 and 11) which are attached at their bases to the table 4 of the main frame 1 by machine screws 74.

In order to obtain the best conditions for providing a strong working magnetic field for the armature, it has been found that laminated pole pieces are particularly desirable and that by making these pole pieces of different materials, a compromise result may be obtained which is superior to the use of any single material known. Two desirable characteristics for a pole piece, which carries a high polarizing magnetic flux and a superimposed alternating current magnetic flux, is high permeability and high resistivity. High permeability or magnetic conductivity is desirable to allow the magnetic flux to easily pass through the pole piece. High resistivity is desirable to counteract hysterisis losses through Foucalt currents which are caused by the continuous reversal of the alternating current flux. These two desirable characteristics do not appear in a single metal. However, it has been found that by using laminations of two metals, a compromise is obtained which includes both desirable characteristics. For example 4% silicon steel has a maximum permeability of 3400 units and a maximum resistivity of 51 units, and Swedish iron (substantially pure iron) has a maximum permeability of 10600 units and a maximum resistivity of 9.6 units.

Figure 14:
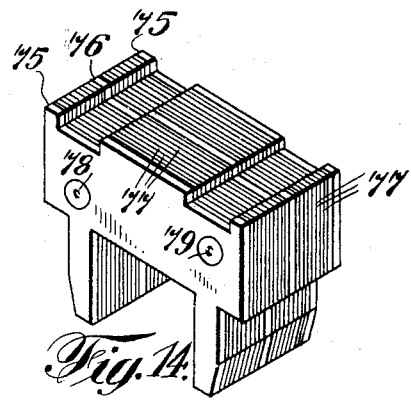
Fig. 14 is an enlarged perspective view of one of the laminated pole pieces.
Figure 17:
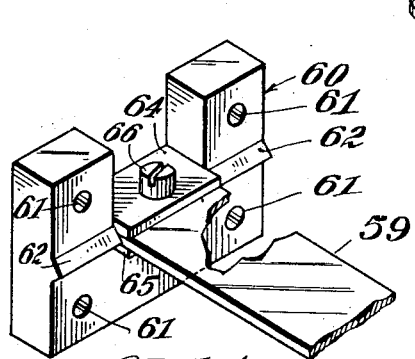
Fig. 17 is a detail view illustrating the mounting for the armature.

In view of the foregoing, the preferred form of the pole pieces of the present invention comprise a structure made up of laminations (Fig. 14) in which the side pieces 75 and a middle piece 76 are 4% silicon steel and the thin laminated parts 77 are Swedish iron (substantially pure iron). These laminations are held together by nickel rivets 78 and 79. It will be observed that the rivet openings through the laminated parts of these pole pieces, and through which the rivets 78 and 79 extend, are positioned differently for each end of the pole piece. For example, the rivets 79 are positioned high in one end of the pole piece and the rivets 78 are positioned low in the opposite end of the same pole piece. The reason for this construction is that the openings through which these rivets pass are punched at the time when each laminated section of the pole piece is punched from a sheet of metal. The position of these rivet holes and the rivets, therefore, position each lamination exactly as it leaves the punch press. It is difficult to make a die that will form both ends of a punching identical in shape, so that if the parts are assembled in hit and miss relation, the result will be a very rough pole piece. This is not desirable. This present construction prevents some of the laminations being turned end for end relative to other laminations while the pole piece is being assembled. The result is that the edges of all the laminations match preferably and produce a very smooth, even surfaced assembled pole piece.

Figure 15:
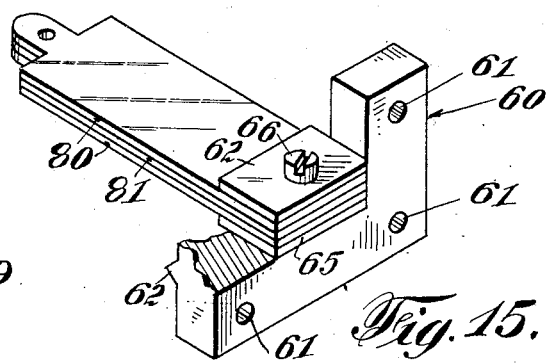
Fig. 15 is an enlarged perspective view with a portion broken away illustrating a laminated armature.
Figure 16:
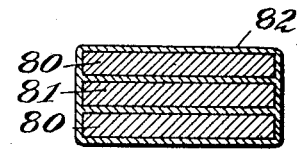
Fig. 16 is a section through the preferred form of a laminated armature.

The same magnetic results that are desirable in the pole pieces are also desirable in the armature, and, therefore, in the preferred form (Figs. 15 and 16), the armature has a laminated structure in which the outside laminations 80 are Swedish iron (substantially pure iron) while the inside member 81 is preferably silicon steel, for example, 4% silicon.

In the preferred form of this armature, the various laminations are covered with a cementing material 82 which passes between the laminations and also encases the entire armature. One form of cement suitable for this purpose is a phenol condensation compound which may be applied to the parts and then heat hardened under pressure so that the parts are accurately and securely held together.

When the unit in the preferred form, as above described, has been assembled, the forward end of the armature 59 is connected with the center of the diaphragm 57 by a rigid connecting post 84 (Figs. 9 and 10), so that when the device is used as a transmitter, voice waves cause the diaphragm to vibrate and thereby flex the armature 59, it being understood that the mounting 60 for the armature is rigidly fastened in such manner as not to pivot. The flexing of the armature 59 in the magnetic field sets up a voice current in the coil 30 which is transmitted to a suitable circuit connected with the connecting screws 50 and 51 and this circuit is connected with a similar telephonic unit. The voice current enters the voice coil of the corresponding unit and causes the armature to vibrate in accordance with the vibration of the armature of the sending station. This vibration operates the diaphragm at the receiving station, thereby completing the communicating circuit.

All of the parts of the structure heretofore described, with the exception of those parts included in the magnetic circuit, i. e. the pole pieces, the permanent magnets, and a diaphragm, are made of some suitable non-magnetic material.

From the foregoing, it will be observed that the present invention provides a very compact, accurately assembled unit capable of high efficiency which is so rigidly constructed as to withstand extremely rough usage without danger of the parts becoming disassociated.

I claim:

1. A device of the character described comprising a table having eccentrically disposed openings therein, one of said openings having substantially parallel chord-like edges, a pair of substantially parallel plates extending at right angles to said table, one on each side of the opening having the chord-like edges, spaced cross bars connecting the tops of said plates, said plates having recesses extending downwardly between said bars, and having recesses extending upwardly in alignment with the downwardly extending recesses, pole pieces locked in said recesses, a coil positioned between legs of said pole pieces, and an armature passing through said coil and between said pole pieces.

2. A device of the character described comprising a table having eccentrically disposed openings therein, one of said openings having substantially parallel chord-like edges, a pair of substantially parallel plates extending at right angles to said table, one on each side of the opening having the chord-like edges, spaced cross bars connecting the tops of said plates, said plates having recesses extending downwardly between said bars, and having recesses extending upwardly in alignment with the downwardly extending recesses, pole pieces having portions fitting in said recesses and having leg portions lying adjacent said plates, a coil positioned between said leg portions of said pole pieces, and an armature passing through said coil and between the leg portions of said pole pieces.

3. A device of the character described comprising a table having eccentrically disposed openings therein, one of said openings having substantially parallel chord-like edges, a pair of substantially parallel plates extending at right angles to said table, one on each side of the opening having the chord-like edges, spaced cross bars connecting the tops of said plates, said plates having recesses extending downwardly between said bars, and having recesses extending upwardly in alignment with the downwardly extending recesses, pole pieces having portions fitting in said recesses and having leg portions lying adjacent said plates, a coil mounted on a form, said form having depressions in the opposite edges thereof to receive portions of said pole pieces, whereby the coil is accurately positioned between the leg portions of the pole pieces, means for locking said pole pieces relative to said plates, and an armature passing through said coil and between said pole pieces.

4. A device of the character described comprising a table having eccentrically disposed openings therein, one of said openings having substantially parallel chord-like edges, a pair of substantially parallel plates extending at right angles to said table, one on each side of the opening having the chord-like edges and spaced from said edges, spaced cross bars connecting the tops of said plates, said plates having recesses extending downwardly between said bars, and having recesses extending upwardly in alignment with the downwardly extending recesses, pole pieces locked in said recesses, a coil positioned between legs of said pole pieces, an armature passing through said coil and between said pole pieces, and permanent magnets positioned between said plates on the opposite sides of said pole pieces with the ends of said magnets located between said table and said cross bars.

5. A device of the character described comprising a table having eccentrically disposed openings therein, one of said openings having substantially parallel chord-like edges, a pair of substantially parallel plates extending at right angles to said table, one on each side of the opening having the chord-like edges, spaced cross bars connecting the tops of said plates, said plates having recesses extending downwardly between said bars, and having recesses extending upwardly in alignment with the downwardly extending recesses, pole pieces locked in said recesses with their inner extremities in spaced relation, a coil positioned between legs of said pole pieces, said plates having openings therein between said recesses, and an armature having one end fastened to one of said plates, said armature passing through the openings in said plates and through said coil between the spaced extremities of said pole pieces.

6. A device of the character described comprising a table having eccentrically disposed openings therein, one of said openings having substantially parallel chord-like edges, a pair of substantially parallel plates extending at right angles to said table, one on each side of the opening having the chord-like edges, spaced cross bars connecting the tops of said plates, said plates having recesses extending downwardly between said bars, and having recesses extending upwardly in alignment with the downwardly extending recesses, said plates having openings therein between said recesses, pole pieces locked in said recesses with their inner extremities in spaced relation, a coil positioned between legs of said pole pieces, an armature passing through said coil, said plates, and between said pole pieces, said armature having one end thereof secured to a bar member, means for adjustably securing said bar member to one of said plates whereby the position of said armature can be varied.

7. A device of the character described comprising a table having eccentrically disposed openings therein, one of said openings having substantially parallel chord-like edges, a pair of substantially parallel plates extending at right angles to said table, one on each side of the opening having the chord-like edges, spaced cross bars connecting the tops of said plates, said plates having recesses extending downwardly between said bars, and having recesses extending upwardly in alignment with the downwardly extending recesses, said plates having openings therein between said recesses, pole pieces locked in said recesses with their inner extremities in spaced relation, a coil positioned between legs of said pole pieces, an armature passing through said coil, said plates, and between said pole pieces, a substantially U-shaped bar member, means for securing one end of said armature in the opening of said bar member, said bar member having a rib extending across one face thereof, one of said plates having a groove therein to receive said rib, and means for attaching said bar member to said grooved plate, said attaching means being adjustable to vary the position of said armature relative to said coil and pole pieces.

8. In a telephonic instrument, a pair of oppositely disposed frame members, pole pieces, said frame member and the ends of said pole pieces having cooperating engaging formations for accurately positioning said pole pieces with their faces in spaced relation, a coil, said coil and said pole pieces cooperating to accurately position said coil between said pole pieces, means for locking said pole pieces and said coil relative to said frame members, permanent magnets, said frame members, pole pieces, and coil serving to determine accurately the positions of said permanent magnets, and means for locking said permanent magnets in assembly.

9. In a device of the character described, the combination of a plate, pole pieces, a coil, and permanent magnets assembled relative thereto, an armature carrier, an armature secured thereto, and securing means to secure said carrier to said plate with the carrier rockable relative to said plate and with said armature passing through said coil and between said pole pieces, said securing means being adjustable to vary the distance of the armature from either pole piece and to vary the angularity of said armature relative to said pole pieces and said coil.

HERBERT R. WARNKE.